Patented Jan. 25, 1944

2,339,958

UNITED STATES PATENT OFFICE 2,339,958

COMPOSITION OF MATTER CONTAINING POLYETHYLENE AND POLYISOBUTYLENE

William J. Sparks, Cranford, N. J., assignor, by mesne assignments, to Jasco, Incorporated, a corporation of Louisiana No Drawing. Application September 14, 1939, Serial No. 294,872

5 Claims. (Cl. 260—42)

This invention relates to compositions of matter, and particularly to a composition of matter containing both polyisobutylene and polyethylene.

Two relatively well-known structural materials have been produced by the polymerization of olefinic substances; one of these, polyisobutylene, is produced by the polymerization of isobutylene-containing olefinic mixtures at temperatures ranging from —40° C. to —100° C. by the application to the cold, condensed olefinic mixture of a Friedel-Crafts type catalyst such as boron fluoride or aluminum chloride. The resulting polymer is a plastic, elastic solid of relatively very high molecular weight ranging from about 1,000 to 250,000 or above. The material shows a substantial tackiness, shows the property of cold flow (that is, a low temperature coefficient of plasticity) and shows substantially no thermal plasticity. Likewise, by virtue of the cold flow it has a low physical strength. The polyethylene is produced by a condensation of the ethylene at elevated temperatures and extremely high pressures ranging from 1,000 atmospheres upward as is shown in U. S. Patent No. 2,153,553. The material is thermoplastic at temperatures above about 130° C., and is quite tough. It is, however, relatively inelastic, and is readily broken, in spite of a certain amount of flexibility. The molecular weight of the polyethylene is unknown, in view of the difficulty of finding a solvent in which its molecular weight can be measured by the method of H. Staudinger (as described in his book "Die Hochmolekulare Verbindungen," Berlin 1932 Verlag Von Julius Stringer, page 56), but high polymers having molecular weights of 5,000; 10,000; 20,0000 or higher have been found to be useful for the purposes of this invention.

The present invention presents a composition of matter comprising a mutual solid solution of polyisobutylene in polyethylene and vice versa, which solid solution avoids the brittleness and ease of breaking or tearing which is characteristic of the polyethylene, but retains the high insolubility of the polyethylene, the toughness and strength of the polyethylene, the elasticity of the polyisobutylene and the thermoplasticity of the polyethylene.

Thus an object of the invention is the production of a new composition of matter in the form of a solid solution of polyethylene and polyisobutylene. A further object of the invention is to produce a highly insoluble, moderately elastic, tough, non-brittle, thermoplastic hydrocarbon polymer. Other objects and details of the invention will be apparent from the following description.

Example 1

In the preparation of the composition of the present invention a suitable quantity of polyisobutylene (commonly known in the trade as "Vistanex Polybutene") having a molecular weight of approximately 200,000 is brought to a temperature of 110° C. to 120° C. by milling the polymer upon the ordinary double roll rubber mill. Approximately 40% to 50% of polyethylene (commonly known to the trade as "Polythene") is then added to the polyisobutylene on the mill and the milling continued until the polyisobutylene is thoroughly dispersed through the polyisobutylene, and until a clear, homogenous mixture is obtained. The total time of milling may readily be kept within the limits of approximately 10 minutes for the preliminary milling of the polyisobutylene, and 10 or 15 minutes for the dispersion and incorporation of the polyethylene. The mill is then desirably cooled to temperatures ranging between 50° C. and 70° C. at which temperature the material is still readily millable. The homogenous compound may then be sheeted out on the mill into films of any desired thickness down to approximately 0.010 inch.

The resulting sheets are flexible, slightly elastic and nearly transparent, with only a very slight opalescence. The sheets are substantially wholly impervious to water, and are highly advantageous for wrapping purposes, since they will stretch and form readily over objects which are to be wrapped in protective films. The thermoplasticity of the material permits of a ready thermosealing of the material, and all of the overlapping edges of a wrapped package are readily sealed by the appropriate application of heat to produce a package which is completely water-tight and completely impervious to moisture, vapors or to submergence in water. Furthermore, the package and its contents are readily subjected to pasteurization at temperatures of 60° C. to 75° C. after sealing, and accordingly foodstuffs may readily be wrapped in sheets of the material, the package thermosealed, and thereafter the package pasteurized by appropriate heat treatment which is preferably limited to pasteurization only, but may be extended if desired to sterilization at temperatures ranging from 100° C. to 105° C., at which temperatures the sheeted composition is still sufficiently strong to withstand low pressure differentials of the order of a few pounds.

The above pointed out composition of matter is believed to be a solid solution of the respective substances in each other, in view of the fact that mild stretching does not alter the appearance of the sheet. Further, at temperatures ranging from 130° C. to 150° C. the composition softens into a semi-fluid plastic, which does not separate into the respective components, but remains homogenous and solidifies upon cooling to a material which is indistinguishable from the composition as originally prepared.

Example 2

Other embodiments of the invention may be prepared by the use of different proportions of the respective substances, a desirable range being from 25 to 80 parts of the polyisobutylene with 75 to 20 parts of the polyethylene. Less than 25 parts of polyethylene in combination with more than 75 parts of polyisobutylene produces a composition having characteristics which depart relatively very slightly from those of polyisobutylene, and compositions containing less than 20 parts of polyisobutylene to 80 parts of polyethylene produce a product the characteristics of which are not sufficiently different from those of polyethylene to be valuable.

The composition of matter of the present invention has outstandingly valuable characteristics alone, in view of its toughness, high physical strength, insolubility, and transparency as distinguished from the individual substances.

Alternatively, the composition of matter may be utilized in combination with many other substances such as fillers, coloring agents, diluents, etc.

Example 3

A composition may be prepared by working the desired proportion of polyisobutylene, preferably 40 to 60 parts, upon a heated roll mill until homogeneity and plasticity are obtained, then adding to the polyisobutylene upon the mill from 1 to 25 parts of paraffin wax having a melting point ranging from 50° C. to 110° C., and thereafter adding to the mixture from 30 to 60 parts of polyethylene, and continuing the milling until a homogenous mixture is obtained. This material likewise is transparent, tough, flexible, somewhat elastic and highly insoluble. The melting point of the material is substantially reduced, and by the incorporation of a sufficient proportion of paraffin wax of a sufficiently low melting point, the melting point of the composition may be brought as low as 75° C.

The embodiment of this example is particularly useful for the coating of paper and other fabrics, in view of its exceedingly high resistance to water and to solvents generally, especially greases, oils and fats.

Example 4

The product according to the above example may be applied to fabrics such as paper or cloth by calendering the mixture onto the fabric by passing the fabric between calender rolls heated to a temperature approximately that of the melting point of the composition as prepared according to the examples above set out. The composition of the invention is thus forced into the pores of the fabric, and around the fibres of the fabric, especially in the case of the low melting point embodiment of Example 3, in which the fabric may be substantially completely saturated with the composition. Alternatively, if the composition of Example 3 is used, and the calendering temperature kept either slightly or substantially below the softening point of the composition, the calender coating remains upon substantially one side only of the fabric, and the composition may be forced by the calender rolls only a small portion of the way through the fabric, or by the application of higher temperatures and higher calendering pressures the composition may be forced through the fabric to any desired extent, up to the point of complete permeation.

Example 5

Alternatively, the composition of matter according to Example 3 may be melted, and the desired fabric submerged in the molten composition and drawn therethrough. The fabric may be cooled quickly after emergence from the molten composition, in which case a substantial thickness of composition remains upon both sides of the fabric. Alternatively, the fabric may be drained at temperatures at or above the melting point of the composition for a substantial length of time, in which case relatively very thin coatings only remain upon the surfaces of the fabric, with the fabric substantially completely saturated with the composition. Or as still another alternative, the fabric may be squeezed between heated rolls, in which instance if the fabric is of relatively open mesh, and the squeezing pressure is high, so much of the molten composition may be removed as to leave merely a coating upon the fibres of the fabric, with the fabric permeable to gases and vapors. However, the water-repellant characteristics of the composition cause the fabric to be water-proof unless a relatively substantial water pressure is applied.

Example 6

The composition of the invention may also be diluted with various fillers such as inorganic pigments of the type of zinc oxide, ferric oxide, chromic oxide, lead chromate, clay, silica, whiting, lithopone, titanium dioxide, lamp black and other similar solid inorganic substances. Alternatively, various organic fillers such as cellulose fibres, cork, etc., may be used.

It may be noted that the composition of matter is relatively incompatible with most of the organic gums and resins.

A highly advantageous baking enamel may be prepared by producing emulsions of the composition of matter by the use of suitable emulsifying agents such as triethanol amine, the mahogany sulfonates, cellulose oleates, morpholine stearate, glyceryl monostearate, methyl cellulose, etc. The desired pigment may be incorporated into the composition of matter before emulsifying in water, or the desired pigment may be emulsified simultaneously with the composition of matter in water. The enamel may then be applied to the objects to be coated, the water evaporated, and the coating baked at temperatures approximating the melting point of the composition.

Various dyestuffs may be incorporated into the composition of matter, particularly the oil-soluble dyestuffs.

Example 7

A highly desirable and advantageous moulding compound may be produced by incorporating into the polythylene-polyisobutylene composition, either with or without the added paraffin wax, substantial quantities of filler, such as cork, wood flour, or the various above-listed inorganic fillers either singly or in combination. The relative proportions may range from 30 parts of filler with 70 parts of polyisobutylene-polyethylene composition to 95 parts of filler with 5 parts of the composition. The resulting compound is highly advantageous for moulding purposes, and may be formed into desired shapes in moulds under conditions of elevated temperature and pressure. The resulting articles are tough and highly resistant to fracture, and highly resistant to temperatures up to about 115° C., in the absence of added paraffin wax.

Upon the application of electrical tests, representative samples of the composition of matter of this invention, prepared as above pointed out, were found to have valuable electrical properties. Thus, at radio frequencies in the neighborhood of one megacycle per second, the composition of matter of the present invention consisting of polyisobutylene and polyethylene showed an electrical loss factor of 0.002 (in contrast to rubber which has a loss factor several times as high at similar frequencies). The composition showed a power factor of 0.0005 at frequencies in the neighborhood of 15 megacycles per second. The insulation resistance of the material was too high to be measured by any known equipment, and is certainly well above 10,000 megohms per centimeter cube; and the electrical breakdown resistance is excellent.

By the invention there is thus produced a highly valuable series of compositions of matter incorporating essentially a mutual solid solution of polyethylene and polyisobutylene having the new, useful and unexpected characteristics of elasticity, freedom from brittleness, substantial physical strength, thermoplasticity, substantial insolubility in acid, alkali, aqueous and/or organic solvents, and the property of coherence in thin sheets and substantial transparency.

While there are above disclosed but a limited number of embodiments of this invention, it is possible to produce still other embodiments without departing from the inventive concepts herein disclosed and it is therefore desired that only such limitations be imposed on the appended claims as are stated therein or required by the prior art.

The invention claimed is:

1. A composition of matter comprising polyethylene, polyisobutylene and wax within the range of 25 to 80 parts of the polyisobutylene with 75 to 20 parts of the polyethylene; characterized by thermoplasticity at a temperature within the range of 75° to 130° C.; substantially complete transparency in thin films, substantially complete insolubility in water, and aqueous solutions, and substantially complete mutual solid solubility.

2. A composition of matter comprising polyethylene, polyisobutylene, wax and a solid filler within the range of 25 to 80 parts of the polyisobutylene with 75 to 20 parts of the polyethylene; characterized by thermoplasticity at a temperature within the range of 75° to 130° C.; substantially complete transparency in thin films, substantially complete insolubility in water, and aqueous solutions, and substantially complete mutual solid solubility.

3. A wrapping sheet comprising in combination polyethylene within the range of 75 to 20 parts with polyisobutylene within the range of 25 to 80 parts, produced by thermoplastic shaping; and characterized by lack of brittleness, resistance to tearing and breaking, high insolubility in watery liquids, toughness, strength and elasticity.

4. A wrapper member particularly suitable for pasteurizable foodstuffs, comprising a thermoplastically shaped member composed of polyethylene in the proportion of 75 to 20 parts with polyisobutylene in the proportion of 25 to 80 parts, characterized by lack of brittleness, resistance to breaking and tearing, toughness, strength, elasticity and insolubility in watery liquids.

5. An insulating wrapper comprising a thermoplastically formed covering composed of polyethylene in the proportion of 75 to 20 parts with polyisobutylene in the proportion of 25 to 80 parts, the said covering being characterized by lack of brittleness, resistance to breaking and tearing, high insolubility in watery liquids, toughness, strength and elasticity, a high electrical breakdown resistance which is characteristic of the individual members of the composition; a low dielectric loss at ultra high radio frequencies, resistance to watery liquids and homogeneity sufficient to avoid ionization within the composition substance.

WILLIAM J. SPARKS.